(12) United States Patent
Zhou et al.

(10) Patent No.: US 9,956,474 B2
(45) Date of Patent: May 1, 2018

(54) FOUR-WHEEL SENSOR CONTROLLED VEHICLE

(71) Applicants: Shengen Zhou, Hunan (CN); Zhiyong Sha, Guangdong (CN)

(72) Inventors: Shengen Zhou, Hunan (CN); Zhiyong Sha, Guangdong (CN)

( * ) Notice: Subject to any disclaimer, the term of this patent is extended or adjusted under 35 U.S.C. 154(b) by 0 days. days.

(21) Appl. No.: 15/329,576

(22) PCT Filed: Jun. 30, 2016

(86) PCT No.: PCT/CN2016/087912
§ 371 (c)(1),
(2) Date: Jan. 27, 2017

(87) PCT Pub. No.: WO2017/071273
PCT Pub. Date: May 4, 2017

(65) Prior Publication Data
US 2017/0259163 A1    Sep. 14, 2017

(30) Foreign Application Priority Data

Oct. 26, 2015   (CN) .................... 2015 2 0830628 U

(51) Int. Cl.
| | | |
|---|---|---|
| *A63C 17/12* | (2006.01) | |
| *B60K 7/00* | (2006.01) | |
| *A63C 17/01* | (2006.01) | |
| *B62K 23/08* | (2006.01) | |
| *B62M 7/12* | (2006.01) | |

(Continued)

(52) U.S. Cl.
CPC ............ *A63C 17/12* (2013.01); *A63C 17/014* (2013.01); *B60K 7/0007* (2013.01); *B60L 11/1877* (2013.01); *B60L 15/00* (2013.01); *B62K 23/08* (2013.01); *B62M 7/12* (2013.01); *B60K 2001/0438* (2013.01); *B62K 2202/00* (2013.01)

(58) Field of Classification Search
None
See application file for complete search history.

(56) References Cited

U.S. PATENT DOCUMENTS

| | | | | |
|---|---|---|---|---|
| 7,983,876 B2 * | 7/2011 | Vock | .................... | A42B 3/0433 |
| | | | | 702/182 |
| 2006/0049595 A1 * | 3/2006 | Crigler | .................. | A63C 17/01 |
| | | | | 280/87.042 |

(Continued)

FOREIGN PATENT DOCUMENTS

CN         104426292 A   *   3/2015

*Primary Examiner* — James A Shriver, II
*Assistant Examiner* — Hilary L Johns

(57) ABSTRACT

A four-wheel sensor controlled vehicle having a base and a control box installed with a battery and a control panel; two driving wheels are installed at the bottom surface of the base close to the front edge of the base, and two universal wheels are installed at the bottom surface of the base close to the rear edge of the base. The driving wheel has a hub assembled with a hub motor assembly of a motor. The base is installed with four weighing sensors at four corners, the first weighing sensor and the third weighing sensor respectively correspond to the fore sole and rear sole of the left foot, the second weighing sensor and the fourth weighing sensor respectively correspond to the fore sole and the rear sole of the right foot. The control panel is connected with the motor and the weighing sensors.

7 Claims, 2 Drawing Sheets

(51) Int. Cl.
  *B60L 11/18*    (2006.01)
  *B60L 15/00*    (2006.01)
  *B60K 1/04*     (2006.01)

(56) References Cited

U.S. PATENT DOCUMENTS

| | | | | |
|---|---|---|---|---|
| 2011/0211363 A1* | 9/2011 | Hurwitz | ......... | A63C 17/01 |
| | | | | 362/545 |
| 2014/0188338 A1* | 7/2014 | Ito | ......... | B62D 51/001 |
| | | | | 701/41 |
| 2014/0326525 A1* | 11/2014 | Doerksen | ......... | A63C 17/12 |
| | | | | 180/181 |
| 2015/0008058 A1* | 1/2015 | Sato | ......... | A63C 17/011 |
| | | | | 180/181 |

\* cited by examiner

FOUR-WHEEL SENSOR CONTROLLED VEHICLE

BACKGROUND OF THE INVENTION

The utility model relates to an electric vehicle, and in particular relates to an electric scooter.

Riding a balancing-vehicle instead of walking has been gradually recognized by people and the popularity of balancing-vehicles becomes wider and wider; at present, balancing-vehicles available on the market mostly are one-wheel balancing-vehicles, two-wheel balancing-vehicles and swing cars, these balancing-vehicles realize acceleration stop or brake deceleration by detecting the change of gravity center of a human body through a digital gyroscope and an acceleration sensor. Two-wheel balancing-vehicles are easy to cause accidents such as fall-off, personnel injuries and the like once having a fault or an improper operation. Present two-wheel sensor controlled vehicles also have bottlenecks of big volume and heavy weight.

BRIEF SUMMARY OF THE INVENTION

The technical problem to be solved by the utility model lies in disclosing a four-wheel sensor controlled vehicle, which realizes balance and acceleration without relying on complex gyroscopes and acceleration sensors and is simple in structure, in view of the drawbacks in the above technology.

In order to achieve the above purpose, the utility model adopts a technical scheme as follows:

a four-wheel sensor controlled vehicle includes a rectangular tabulate base, of which the bottom surface is installed with a control box; a battery and a control panel are installed in the control box;

two driving wheels are symmetrically installed at the position of the bottom surface of the base close to the front edge of the base; two universal wheels are symmetrically installed at the position of the bottom surface of the base close to the rear edge of the base;

the driving wheel is that a hub is assembled with a hub motor assembly of a motor that drives the hub to rotate;

the base is installed with four weighing sensors, which respectively are a first weighing sensor, a second weighing sensor, a third weighing sensor and a fourth weighing sensor; the four weighing sensors are located at four corners of the rectangle;

the first weighing sensor and the third weighing sensor respectively correspond to the positions of the fore sole and the rear sole of the left foot of a user; the second weighing sensor and the fourth weighing sensor respectively correspond to the positions of the fore sole and the rear sole of the right foot of the user;

the battery is connected with the control panel, the control panel is connected with the motor of the hub motor assembly, and the control panel is further connected with the weighing sensors.

The preferred embodiment and further improvement of the utility model are as follows:

(1) The hub motor assembly is installed on the bottom surface of the base through a hub motor bracket; the universal wheel is installed on the bottom surface of the base through a universal wheel bracket; the four weighing sensors of the base are located between the base and the bracket of the wheel; and both the front end of the base and the rear end of the base are bent downwards.

(2) The control panel is integrated with a CPU and an operational amplifier circuit; and the operational amplifier circuit is connected with the weighing sensor.

(3) The driving wheel is of 2.5 to 2.8 inches; and the universal wheel is of 2 to 2.5 inches.

(4) The distance between the first weighing sensor and the third weighing sensor is 18 to 22 cm; and the distance between the second weighing sensor and the fourth weighing sensor is 18 to 22 cm.

(5) The surface of the base is provided with an indicator lamp.

Further: the hub motor assembly includes a hub housing used for installing a tyre; the motor of the hub motor assembly includes a motor shaft, a motor outer rotor and a motor stator assembled with a coil; the motor shaft is fixedly installed, the motor stator is fixed with the motor shaft; the motor outer rotor is connected with the motor shaft through a bearing; and the hub housing is rotatably installed on the motor shaft through a bearing.

Still further: two ends of the motor shaft are fixedly installed on the hub motor bracket, and the hub motor bracket is installed on the bottom surface of the base.

The utility model has benefits as follows:

in the four-wheel sensor controlled vehicle disclosed by the utility model, two driving wheels are symmetrically installed at the position of the bottom surface of the base close to the front edge of the base, two universal wheels are symmetrically installed at the position of the bottom surface of the base close to the rear edge of the base; the whole structure is similar to a tablet computer with four wheels and is simple and compact; as supported by four wheels, the four-wheel sensor controlled vehicle is always in a balanced state, without needing complex components such as gyroscope and acceleration sensor; the two front wheels drive the four-wheel sensor controlled vehicle, and the two rear wheels follow the two front wheels and steer; according to the utility model, the change of gravity center of a human body may be detected through the four weighing sensors, after the change of gravity center is processed by the operational amplifier circuit, a single chip machine operates and drives the motor to move forwards, swerve or stop; thus, the four-wheel sensor controlled vehicle is highly reliable.

The driving wheel in the utility model is that a hub is assembled with a hub motor assembly of a motor that drives the hub to rotate; in this way, after the motor that drives the hub to rotate is integrated on the hub, the structure of the whole driving wheel and the power transmission are more compact.

The base in the utility model is installed with four weighing sensors, which respectively are a first weighing sensor, a second weighing sensor, a third weighing sensor and a fourth weighing sensor; the four weighing sensors are located at four corners of the rectangle; through the weighing sensors, the change of the weight on the base is detected; through the control panel, power control is realized; thus, the four-wheel sensor controlled vehicle is more intelligent.

In the utility model, the first weighing sensor and the third weighing sensor respectively correspond to the positions of the fore sole and the rear sole of the left foot of a user; the second weighing sensor and the fourth weighing sensor respectively correspond to the positions of the fore sole and the rear sole of the right foot of the user; in this way, the four weighing sensors can accurately measure the weight and weight change at the position trampled by the user.

Figure 1:
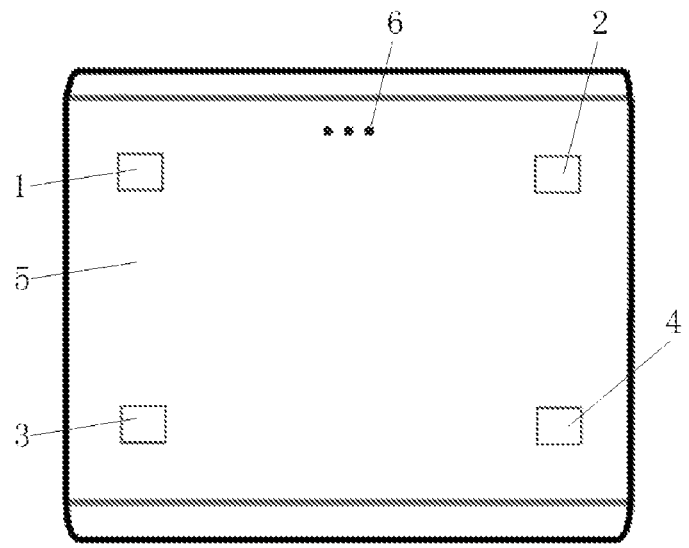
FIG. 1 is a top view of the structure of a specific embodiment of the utility model.

BRIEF DESCRIPTION OF REFERENCE NUMERALS 1 represents a first weighing sensor, 2 represents a second weighing sensor, 3 represents a third weighing sensor, 4 represents a fourth weighing sensor, 5 represents a base, 6 represents an indicator lamp, 7 represents a hub motor assembly, 8 represents a hub motor bracket, 9 represents a control box, 10 represents a universal wheel bracket, 11 represents a universal wheel;

701 represents a motor shaft, 702 represents a motor stator, 703 represents a motor outer rotor, 704 represents a wheel body, 711 represents a hub housing, 731 represents a bearing.

DETAILED DESCRIPTION OF THE INVENTION

Specific embodiments of the utility model are described below in conjunction with accompanying drawings and embodiments.

Figure 2:
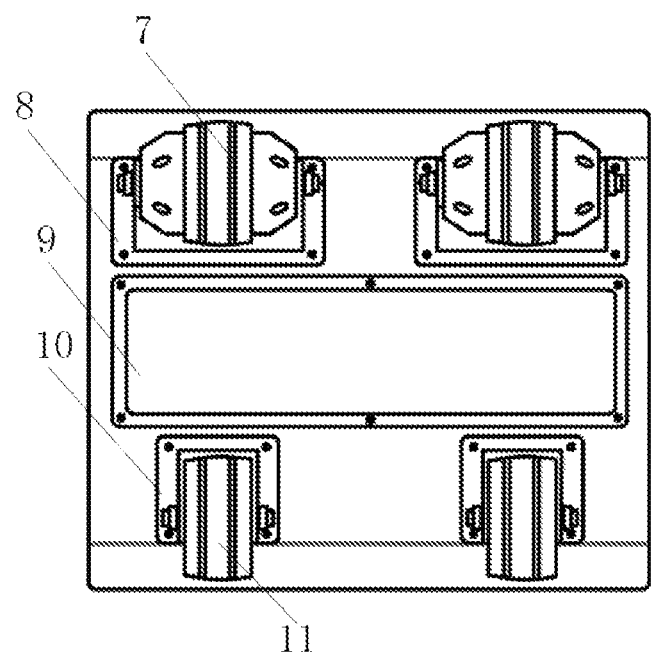
FIG. 2 is a bottom view of the structure of a specific embodiment of the utility model.
Figure 3:
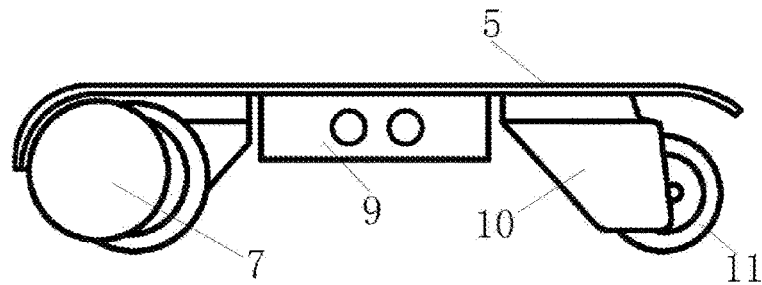
FIG. 3 is a front view of the structure of a specific embodiment of the utility model.
Figure 4:
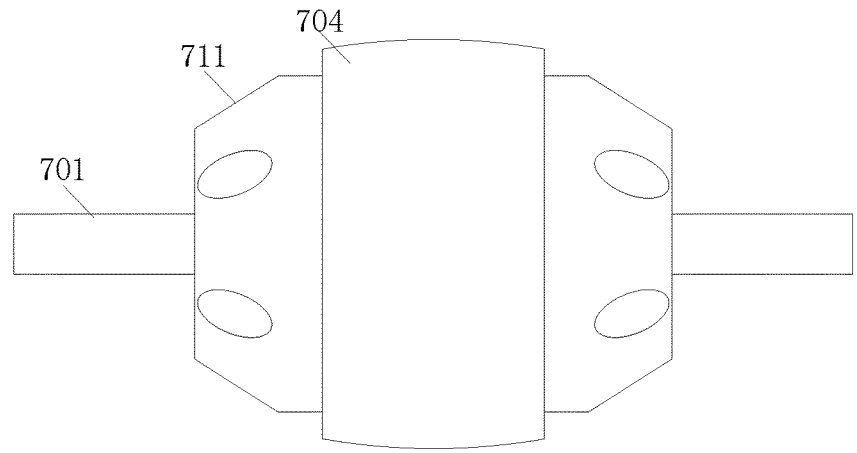
FIG. 4 is an external structure diagram of a specific embodiment of a hub motor assembly of the utility model.
Figure 5:
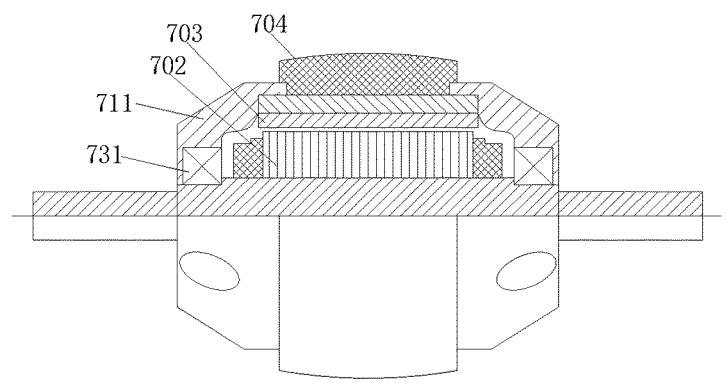
FIG. 5 is a half-sectional view of FIG. 4.

FIG. 1 to FIG. 4 shows specific embodiments of the utility model; as shown in the drawings, the four-wheel sensor controlled vehicle disclosed by the utility mode includes a rectangular tabulate base 5, of which the bottom surface is installed with a control box 9; a battery and a control panel are installed in the control box 9.

As shown in the drawings, two driving wheels are symmetrically installed at the position of the bottom surface of the base 5 close to the front edge of the base 5, and two universal wheels 11 are symmetrically installed at the position of the bottom surface of the base 5 close to the rear edge of the base 5.

As shown in the drawings, the driving wheel is that a hub is assembled with a hub motor assembly 7 of a motor that drives the hub to rotate.

As shown in the drawings, the base 5 is installed with four weighing sensors, which respectively are a first weighing sensor 1, a second weighing sensor 2, a third weighing sensor 3 and a fourth weighing sensor 4; the four weighing sensors are located at four corners of the rectangle.

As shown in the drawings, the first weighing sensor 1 and the third weighing sensor 3 respectively correspond to the positions of the fore sole and the rear sole of the left foot of a user; and the second weighing sensor 2 and the fourth weighing sensor 4 respectively correspond to the positions of the fore sole and the rear sole of the right foot of the user.

As shown in the drawings, the battery is connected with the control panel, the control panel is connected with the motor of the hub motor assembly 7, and the control panel is further connected with the weighing sensors.

Preferably, as shown in the drawings, the hub motor assembly 7 is installed on the bottom surface of the base 5 through a hub motor bracket 8, and the universal wheel 11 is installed on the bottom surface of the base 5 through a universal wheel bracket 10; through the hub motor bracket and the universal wheel bracket, respective reliable assembly and steering requirements are realized, the provision of structures such as spring on the bracket can achieve a buffering function; the four weighing sensors of the base are located between the base and the bracket of the wheel; an aluminum plate servers as a trample surface, which won't increase too much weight and meanwhile is easy to clean; both the front end of the base 5 and the rear end of the base 5 are bent downwards. The bent shape has a capability of blocking obstacles and proofing wind.

Preferably, as shown in the drawings, the control panel is integrated with a CPU and an operational amplifier circuit, and the operational amplifier circuit is connected with the weighing sensor. Through the operational amplifier circuit and the CPU, a very intelligent control process can be realized. Specifically, the four weighing sensors are distributed below two fore soles and two rear soles. The weighing sensor is started after the body weight reaches certain weight; if the body is forwards, the two front weighing sensors detect it and transmit it to the control panel, then the control panel controls and drives the hub motor to move forwards straightly; the bigger the two front gravity forces, the bigger the acceleration. When the four weighing sensors sense the same or similar weight, the four-wheel sensor controlled vehicle stops. When the gravity forces at the left side and the right side are different, the four-wheel sensor controlled vehicle realizes swerve.

Preferably, as shown in the drawings, the driving wheel is of 2.5 to 2.8 inches, and the universal wheel is of 2 to 2.5 inches.

Preferably, as shown in the drawings, the distance between the first weighing sensor 1 and the third weighing sensor 3 is 18 to 22 cm, and the distance between the second weighing sensor 2 and the fourth weighing sensor 4 is 18 to 22 cm.

Preferably, as shown in the drawings, the surface of the base 5 is provided with an indicator lamp 6. The indicator lamp 6 is used to indicate battery level and fault alarm.

Preferably, as shown in the drawings, the hub motor assembly 7 includes a hub housing 711 used for installing a tyre; the motor of the hub motor assembly 7 includes a motor shaft 701, a motor outer rotor 703 and a motor stator 702 assembled with a coil; the motor shaft 701 is fixedly installed, the motor stator 702 is fixed with the motor shaft 701; the motor outer rotor 703 is connected with the motor shaft 701 through a bearing; the hub housing 711 is rotatably installed on the motor shaft 701 through a bearing. In the hub motor assembly in this embodiment, when the motor is started, the motor outer rotor rotates to realize the rotation of the hub, and a high-elasticity high-quality solid rubber tyre is installed outside the hub, this structure is very compact; the output power per unit weight is big and the volume is reduced.

Preferably, as shown in the drawings, two ends of the motor shaft 701 are fixedly installed on the hub motor bracket 8, and the hub motor bracket 8 is installed on the bottom surface of the base.

The above gives a detailed description for the preferred embodiments of the utility model in conjunction with accompanying drawings; however, the utility model is not limited to the above embodiments. In the range of knowledge mastered the ordinary staff in the art, various changes can be made without departing from the spirit of the utility model; these changes are related to relevant technologies familiar to those skilled in the art and fall within the scope of protection of the utility model patent.

Many other changes and modifications can be made without departing from the idea and scope of the utility model. It is understandable that the utility model is not limited to a specific embodiment; the scope of the utility model is defined by the claims appended herein.

What is claimed is:

1. A four-wheel sensor controlled vehicle, characterized in that: the four-wheel sensor controlled vehicle comprises a rectangular tabulate base (5), of which the bottom surface is installed with a control box (9); a battery and a control panel are installed in the control box (9);

two driving wheels are symmetrically installed at the position of the bottom surface of the base (5) close to the front edge of the base (5); two universal wheels (11) are symmetrically installed at the position of the bottom surface of the base (5) close to the rear edge of the base (5);

the driving wheel is a hub, which is assembled with a hub motor assembly (7) of a motor that drives the hub to rotate;

the base (5) is installed with four weighing sensors, which respectively are a first weighing sensor (1), a second weighing sensor (2), a third weighing sensor (3) and a fourth weighing sensor (4); the four weighing sensors are located at four corners of the rectangle;

the first weighing sensor (1) and the third weighing sensor (3) respectively correspond to the positions of the fore sole and the rear sole of the left foot of a user; the second weighing sensor (2) and the fourth weighing sensor (4) respectively correspond to the positions of the fore sole and the rear sole of the right foot of the user; and the battery is connected with the control panel, the control panel is connected with the motor of the hub motor assembly (7), and the control panel is further connected with the weighing sensors;

the hub motor assembly (7) is installed on the bottom surface of the base (5) through a hub motor bracket (8); at least one of the two universal drive wheels is installed on the bottom surface of the base (5) through a universal wheel bracket (10); the four weighing sensors of the base (5) are located in-between the base (5) and the bracket of the wheel; and both the front end of the base (5) and the rear end of the base (5) are bent downwards.

2. The four-wheel sensor controlled vehicle according to claim 1, characterized in that: the control panel is integrated with a CPU and an operational amplifier circuit; and the operational amplifier circuit is connected with the weighing sensor.

3. The four-wheel sensor controlled vehicle according to claim 1, characterized in that: the diameter of the driving wheel is 2.5 to 2.8 inches; and the diameter of the universal wheel is 2 to 2.5 inches.

4. The four-wheel sensor controlled vehicle according to claim 1, characterized in that: the distance between the first weighing sensor (1) and the third weighing sensor (3) is 18 to 22 cm; and the distance between the second weighing sensor (2) and the fourth weighing sensor (4) is 18 to 22 cm.

5. The four-wheel sensor controlled vehicle according to claim 1, characterized in that: the surface of the base (5) is provided with an indicator lamp (6).

6. The four-wheel sensor controlled vehicle according to claim 1, characterized in that: the hub motor assembly (7) comprises a hub housing (711) used for installing a tyre; the motor of the hub motor assembly (7) comprises a motor shaft (701), a motor outer rotor (703) and a motor stator (702) assembled with a coil; the motor shaft (701) is fixedly installed, the motor stator (702) is fixed with the motor shaft (701); the motor outer rotor (703) is connected with the motor shaft (701) through a bearing (731); and the hub housing (711) is rotatably installed on the motor shaft (701) through a bearing (731).

7. The four-wheel sensor controlled vehicle according to claim 1, characterized in that: two ends of the motor shaft (701) are fixedly installed on the hub motor bracket (8), and the hub motor bracket (8) is installed on the bottom surface of the base (5).

* * * * *